United States Patent
Joshi et al.

(10) Patent No.: US 7,603,219 B2
(45) Date of Patent: Oct. 13, 2009

(54) METHOD FOR ESTIMATING CLUTCH ENGAGEMENT PARAMETERS IN A STRATEGY FOR CLUTCH MANAGEMENT IN A VEHICLE POWERTRAIN

(75) Inventors: Sameer A. Joshi, Norristown, PA (US); Ananthakrishnan Surianarayanan, Lansdale, PA (US); Chia-Hsiang Liu, Northville, MI (US)

(73) Assignee: Eaton Corporation, Cleveland, OH (US)

( * ) Notice: Subject to any disclaimer, the term of this patent is extended or adjusted under 35 U.S.C. 154(b) by 34 days.

(21) Appl. No.: 12/070,942

(22) Filed: Feb. 22, 2008

(65) Prior Publication Data
US 2008/0147285 A1   Jun. 19, 2008

Related U.S. Application Data

(63) Continuation of application No. 11/471,267, filed on Jun. 20, 2006, now abandoned.

(51) Int. Cl.
G06F 7/00   (2006.01)
B60W 10/02   (2006.01)
(52) U.S. Cl. ............................ 701/68; 192/3.51
(58) Field of Classification Search ............ 701/67, 701/68; 192/3.51; 475/43; 477/5
See application file for complete search history.

(56) References Cited

U.S. PATENT DOCUMENTS

| 5,871,419 | A | 2/1999 | Amendt |
| 6,470,253 | B1 | 10/2002 | Salecker et al. |
| 6,480,777 | B1 | 11/2002 | Sato et al. |
| 7,158,873 | B2 | 1/2007 | Eich et al. |
| 7,258,648 | B2 | 8/2007 | Smith et al. |
| 2005/0130806 | A1 | 6/2005 | Lopez |

FOREIGN PATENT DOCUMENTS

| DE | 19571455 A1 | 5/1999 |
| EP | 1437520 A2 | 7/2004 |
| FR | 2854848 | 11/2004 |

OTHER PUBLICATIONS

K. Madsen, et al., "Methods for Non-Linear Least Squares Problems", 2nd Edition, Apr. 2004, pp. 1-30.
International Search Report and Written Opinion of the International Searching Authority for PCT/IB2007/001644 dated Nov. 27, 2007.

*Primary Examiner*—Mark Hellner
(74) *Attorney, Agent, or Firm*—Brooks Kushman P.C.

(57) ABSTRACT

A method is disclosed for computing clutch engagement characteristics of a friction clutch system in a vehicle powertrain. A dynamic model of the system is used under conditions that cause clutch slipping. Algebraic equations defining a functional relationship between clutch torque and an engagement angle have characteristic parameters that are estimated using a non-linear least squares technique. The non-linear least squares technique repetitively minimizes the difference between a measured clutch output speed and a clutch output speed from the system dynamic model for the same inputs until a small insignificant error is reached. Parameter estimates are used to update each engagement characteristic.

12 Claims, 3 Drawing Sheets

METHOD FOR ESTIMATING CLUTCH ENGAGEMENT PARAMETERS IN A STRATEGY FOR CLUTCH MANAGEMENT IN A VEHICLE POWERTRAIN

CROSS-REFERENCE TO RELATED APPLICATIONS

This application is a continuation of U.S. application Ser. No. 11/471,267, filed Jun. 20, 2006 now abandoned. Applicants claim the benefit of that application.

BACKGROUND OF THE INVENTION

1. Field of the Invention

The invention relates to a method for modifying friction clutch engagement characteristics to compensate for clutch wear.

2. Background of the Invention

In a typical powertrain system for road vehicles, such as light-duty trucks and heavy-duty trucks, torque is delivered from the vehicle engine to the torque input side of a multiple-ratio transmission through a friction clutch that is under the control of the vehicle operator. Torque is transmitted from a torque output portion of the transmission through a transmission mainshaft, a driveshaft and a differential-and-axle assembly to vehicle traction wheels. A vehicle operator may change the overall speed ratio of the powertrain by selectively engaging and disengaging clutch elements or brake elements in the transmission as the transmission drive ratio is upshifted and downshifted. To effect an upshift or a downshift, the operator typically will open the friction clutch by relieving a clutch apply spring force to separate an engine driven clutch friction disk and a torque output clutch friction disk. When torque delivery is interrupted in this fashion, ratio changes can occur in the transmission under zero torque conditions.

When the clutch is applied following a ratio upshift or downshift, a power flow path through the clutch is reestablished following a clutch slipping mode. In order to maintain optimum shift quality, a desired calibrated relationship of clutch torque and clutch engagement angle must be maintained during the clutch engagement interval. Although a correct functional relationship of clutch torque and clutch engagement angle can be precalibrated initially, clutch wear, which will inevitably take place due to numerous clutch engagements and disengagements, will result in a change in the functional relationship of clutch torque and engagement angle. Shift quality then may deteriorate and clutch control system failures may occur because of excessive wear. This deterioration of clutch performance due to wear also will affect vehicle launch from a standing start as the vehicle operator engages the clutch friction disks.

Currently, this clutch friction disk wear problem is dealt with by scheduling periodic time-consuming servicing of the vehicle, which results in an increase in overall operating costs and unproductive down-time for the vehicle.

SUMMARY OF THE INVENTION

An objective of the invention is to provide for an automatic control for clutch engagement management that avoids the problems identified in the preceding background discussion without a need for manual intervention.

Typically, a road vehicle, such as a truck, can be operated in one of three operating modes; i.e., a torque mode, a speed mode, or a combined torque and speed mode. For purposes of describing an embodiment of the present invention, it will be assumed that the vehicle is operated in a speed mode, which essentially is similar to a well-known cruise control application for automotive vehicles, wherein the vehicle driver sets a particular speed for the vehicle to maintain. The speed mode of control ensures that the truck will maintain the set speed. The torque at the wheels for the vehicle is controlled during clutch engagements by controlling the engine torque delivered through the clutch to the transmission as a function of the clutch engagement angle.

The clutch torque for a given engagement angle can be determined by using a precalibrated functional relationship between clutch torque and engagement angle, which may be stored in the form of algebraic equations in powertrain controller memory registers. As clutch wear occurs in a clutch system incorporating the invention, a new revised functional relationship of clutch torque and engagement angle is obtained in order to maintain shift quality and to predict when excessive clutch wear has occurred following continuous use.

A development of a revised or current relationship between clutch torque and engagement angle is achieved using a driveline system dynamic model. The method of the invention will estimate parameters for characteristic algebraic functions that define a relationship of engagement angle and clutch torque and insert them in the equations in the system model. The clutch behavior then will resemble as close as possible, following clutch wear, the behavior of the clutch in an earlier period of the clutch operating history. A new functional relationship between clutch torque and engagement angle with new parameters is used at periodic intervals, rather than an original functional relationship with a precalibrated set of parameters.

Although the invention can be applied to a road vehicle, as disclosed in this specification, it also could be used in a powertrain for other applications, such as tracked vehicles, tractors and mobile building construction equipment.

For purposes of this disclosure, the term "engagement angle" refers to the angle of a clutch mechanical actuator or linkage under the control of the vehicle operator to adjust the spacing between the clutch torque input friction disk and the clutch torque output friction disk during clutch engagements and disengagements. The angle of the clutch disk mechanical actuators is a control variable used to define the algebraic equations for the system model. If the clutch is a fluid pressure actuated clutch, the variable that can be used may be the pressure applied to a pressure operated clutch engagement and disengagement control servo. The term "engagement angle," therefore, is a generic term that can apply to a variety of clutch actuators under the control of the vehicle operator, including electromagnetic actuators where the variable would be voltage. Typically, clutch friction disk motion may be related linearly to driver-operated foot pedal displacement. The relationship of clutch disk motion and pedal displacement, however, need not be linear.

The control strategy of the invention makes use of a given engine input torque and engagement angle, which are used in solving dynamic equations of the vehicle driveline system model to obtain a clutch output speed. The output speed is determined by the functional relationship of clutch torque and engagement angle stored in memory registers of an electronic digital microprocessor controller with read-only memory (ROM) in which control algorithms reside. Random access memory (RAM) stores control data, such as engine speed and clutch speed, during repetitive control loops. A central processor unit uses the stored data in executing algorithms in ROM.

In estimating revised parameters for a functional relationship between engagement angle and clutch torque, which comprises a mathematical construct, the parameters are determined by assuming torque equilibrium during slipping of the clutch disks. The mathematical construct may, for example, be in the form of polynomial equations. The relationship between clutch torque and engagement angle is initially calibrated using measured or known data.

Following clutch wear, the parameters of the functional relationship of engagement angle and clutch torque are determined or estimated by using dynamic equations of the driveline and "in-vehicle" measurements of engagement angle, engine torque, engine speed and output clutch disk speed.

The parameter estimation is done by introducing known inputs to the system model and integrating system dynamic equations to find outputs. The dynamic equations of the disclosed embodiments of the invention may include a first derivative of a clutch speed term and a first derivative of an engine speed term, but derivatives of other terms could be included as well in the dynamic equations. Thus the integral of each derivative will yield engine speed and clutch speed, two of the outputs, as well as any other terms that are included. The other output, clutch torque, is computed algebraically.

Initially, "guess" values of parameters of the functional relationship of engagement angle and output clutch disk torque are used. The guess values are based on experience. This is followed by an optimization method that computes new parameters. This optimization method minimizes the differences between the output of the model and a measured output (i.e., engine speed and clutch speed). The final estimated values for the parameters are used in determining the current functional relationship of engagement angle and clutch torque ($\alpha$ and $T_{cl}$). The new optimized relationship between clutch torque and engagement angle is determined in a repetitive fashion during successive computations using the guess values of parameters and stored data in ROM memory of the microprocessor. The optimized relationship then is used in the functional relationship between clutch engagement angle and clutch torque for subsequent clutch engagements.

DETAILED DESCRIPTION OF AN EMBODIMENT OF THE INVENTION

Figure 2:
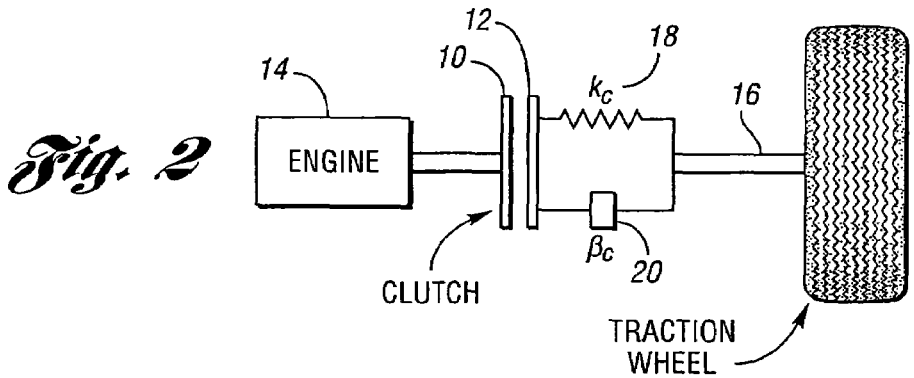
FIG. 2 is a schematic representation of a vehicle powertrain in which engine torque is transmitted through a clutch to a transmission.

In the schematic diagram of FIG. 2, the clutch input friction disk is shown at 10 and the clutch output friction disk is shown at 12. Disk 10 is drivably connected to engine 14. The clutch output disk is drivably connected to a transmission mainshaft or a driveline driveshaft 16. Driveline elasticity is schematically represented by a spring constant 18 (Kc), and a vibration damper constant is schematically represented by at 20 ($\beta_c$). During upshifts and downshifts of the transmission, or during vehicle launch, torque delivery from the engine is interrupted as the clutch disks 10 and 12 are opened. A dynamic model of the entire system can be found by applying a torque equilibrium condition at various nodes in the structure. Dynamic equations for the driveline shown in FIG. 2, when the clutch is slipping in an engagement mode, may be indicated as follows:

$$\dot{\omega}_e = -\frac{\beta_e}{J_e}\omega_e - \frac{1}{J_e}T_{cl} + \frac{1}{J_e}T_e \qquad (1)$$

$$\dot{\omega}_c = -\frac{\beta_c}{J_c}\omega_c - \frac{1}{J_c}T_l + \frac{1}{J_c}T_{cl} \qquad (2)$$

$$T_{cl} = F(\alpha, a_0, a_1, a_2, \ldots a_n) \qquad (3)$$

where:
$\omega_e$=Engine speed, measured on the vehicle;
$\omega_c$=Clutch/Mainshaft speed, measured on the vehicle;
$\beta_e$=Crankshaft friction coefficient;
$T_e$=Engine torque=measured on the vehicle;
$T_{cl}$=Torque transmitted by the clutch;
$J_e$=Engine inertia;
$T_l$=Load torque at wheel;
$\beta_c$=Mainshaft and wheel friction coefficient;
$J_c$=Inertia of the mainshaft; and
$\alpha$=Angle of engagement.

For purposes of this description, the term "clutch speed" means the speed of the clutch output disk 12.

Figure 1:
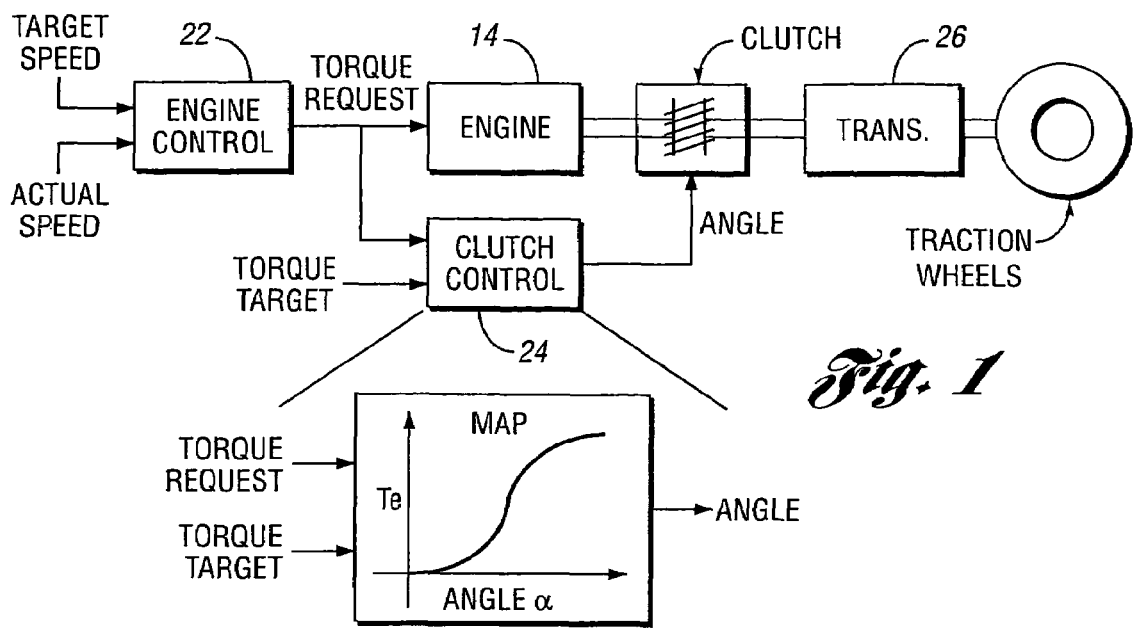
FIG. 1 is a schematic representation of a clutch system for a vehicle powertrain that is operated in a so-called speed mode of control.

FIG. 1 illustrates in schematic block diagram form a vehicle powertrain that is operated in a so-called speed mode. One of the inputs to an engine controller 22 for the engine 14 is a target vehicle speed that is set by the vehicle operator. It is necessary for the engine control to receive actual speed information in order to compare it to a target speed. The actual speed is measured in the usual fashion and is used as one of the inputs required to make vehicle speed adjustments if the actual vehicle speed is not equal to the target speed.

The engine control 22 generates a torque request command for the engine 14 that is based on the difference between the actual vehicle speed and the target vehicle speed. If the actual vehicle speed exceeds the target vehicle speed, the engine controller will reduce the engine torque, which in turn reduces the vehicle speed. This type of speed control is well-known in the industry. That torque request is delivered to a clutch controller 24.

In FIG. 1, the controller 24, which is labeled "clutch control," is an electronic microprocessor that includes memory data storage registers for storing a relationship between clutch torque and engagement angle. This functional relationship, or map, is shown in enlarged form in FIG. 1 for purposes of clarity. The clutch engagement angle is labeled "$\alpha$" and the clutch torque is labeled "$T_{cl}$." These variables will be used later in this description to explain the driveline dynamic equations.

For any given clutch engagement angle $\alpha$, a torque input $T_{cl}$ for the clutch control can be determined. The shape of the plot of clutch torque $T_{cl}$ and engagement angle $\alpha$, as seen in FIG. 1, typically is "S" shaped with clutch torque and engagement angle as variables. The engagement angle determines the state of the clutch; i.e., open, slipping or closed. The torque output disk of the clutch is mechanically connected to a multiple ratio transmission 26.

In the driveline dynamic equations indicated above, the clutch disk speed $\omega_c$ is determined under the assumption that the traction wheels are directly attached to the mainshaft. This assumption, however, could be modified if a propeller shaft, differential gearbox, axle shafts, synchronizer clutches and synchronizer shafts would be included in the transmission model. That would affect the dynamics in known fashion.

When the clutch is fully engaged, the clutch speed and the engine speed are equal. They are different when the clutch slips. In the curve of the plot of clutch torque $T_{cl}$ shown in FIGS. 1 and 3, α is used as a variable and the coefficients $a_n$, when chosen correctly, will make the plot appear typically as an "S" curve as a normalized engagement angle α varies from 0 to 1.

Figure 3:
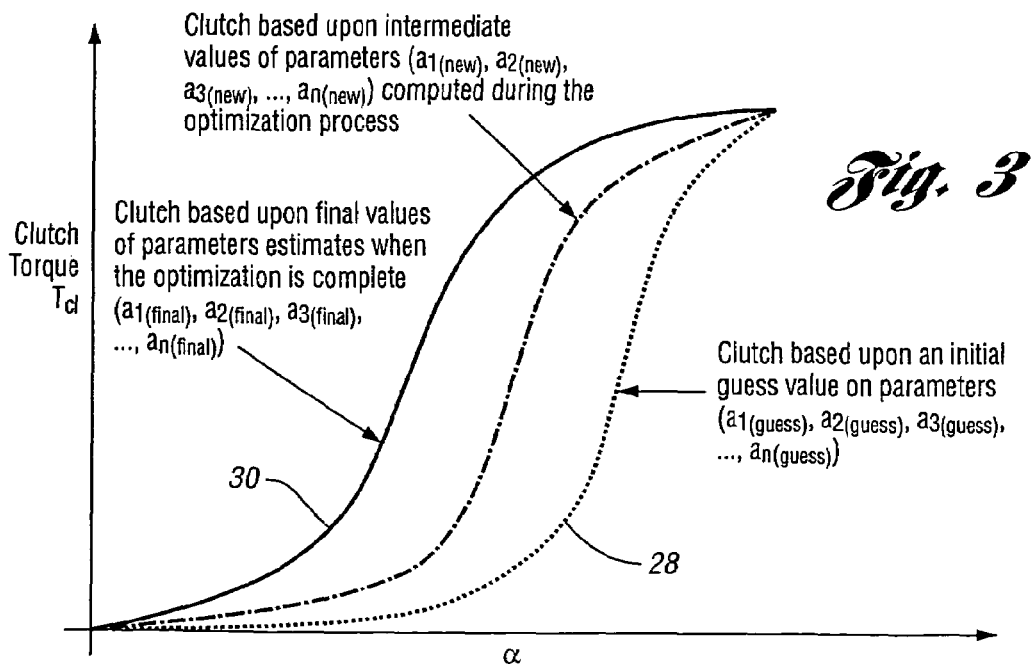
FIG. 3 is a plot of clutch torque versus engagement angle for a clutch in a driveline, such as that shown in FIG. 2.

In the plot of FIG. 3, the clutch torque $T_{cl}$ will be 0 when the engagement angle is 0. This represents the instant when the clutch disks begin to close and incipient slip is about to occur. When the engagement angle α is 1.0, the clutch is closed and the value for clutch torque is equal to the lower of engine torque $T_e$ and static clutch torque capacity $T_{static}$. The parameters $\alpha_0, a_1, a_2 \ldots a_n$ (coefficients) of the functional relationship between the engagement angle α and $T_{cl}$ determine the shape of the curve, as will be explained subsequently. Some of the parameters following wear, for example, are known values at all times regardless of the shape of the curve. Other parameters, as will be explained subsequently, are estimated in view of the time history of engine torque, engine speed and clutch output disk speed.

In the procedure for estimating unknown parameters, certain values are known for engine inertia, mainshaft inertia, torque, gear inertia, shaft stiffness, etc. This will permit the solution of the system of differential algebraic equations (DAE) indicated above.

Since some of the parameter values are known, as indicated previously. The shape of the curve is determined by estimating the values of parameters that change with clutch wear using a non-linear least squares algorithm, which is an optimization method.

Figure 4:
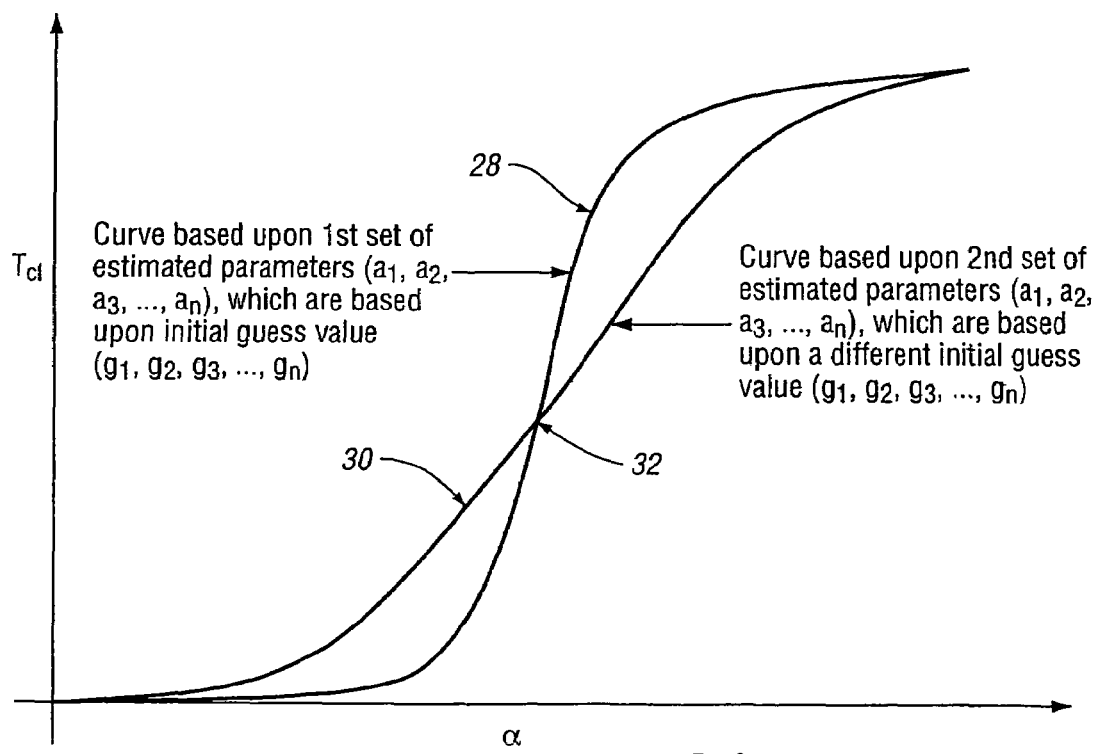
FIG. 4 is a plot, generally similar to the plot of FIG. 3, which demonstrates that multiple sets of parameters may be identified for a given measured data set depending upon the initial guess values chosen for the parameters.

The data used in this parameter estimation technique is based upon values of the engagement angle, engine torque and output clutch disk speed. Since non-linear least squares is not a global optimization algorithm, multiple sets of parameters, $a_n$, can be identified for the same input data to the same parameter estimation algorithm, depending upon the initial "guess" values of the parameters. In the example illustrated in FIG. 4, two different sets of identified parameters can result in two different functional relationships of clutch torque and engagement angle. When multiple solutions are obtained, the set of parameters corresponding to the smallest value of the objective function must be substituted into the functional equation for the relationship of clutch torque and engagement angle. Those parameters would be used in the dynamic model for the driveline to obtain a value for clutch torque "$T_{cl}$" for a given value of engagement angle "α", as shown at 32 in FIG. 4, assuming that the clutch is slipping.

During parameter estimation in a system of differential algebraic equations, the procedure starts by using vehicle data, observation times and measurements. It is the goal of the non-linear least squares optimization method to minimize the sum of the squares of the errors between the output of the model and the measured values. The errors are errors in clutch speed. The errors could include, however, errors in engine speed and power output shaft speed as well. In this way, the current functional relationship of clutch torque and engagement angle is computed so as to maintain good shift quality, predict clutch wear and avoid system failures due to excessive clutch wear.

The variable under the control of the operator for controlling torque input to the transmission is the engagement angle. The current plot of engagement angle and clutch torque, as developed by the parameter estimation method, will replace the original calibrated plot for engagement angle and clutch torque. As previously indicated, the original calibrated relationship of clutch torque and engagement angle is obtained using measured data. Following clutch wear, the actual relationship between clutch torque and engagement angle uses the estimated parameters of the model so that the clutch system will behave as it did prior to the occurrence of clutch wear. The parameter estimation uses the input data, whereby engine torque and engagement angle are fed into the dynamic model of the driveline system. The model then is integrated to define outputs.

An initial guess value for each of the parameters to be estimated is used as a first step in an iterative optimization process. The dynamic driveline system model is integrated, as indicated above, to get a time evolution of $\omega_e$ and $\omega_c$. An optimization method then is used to adjust the unknown parameters so as to minimize the difference between the output of the model and the measured outputs. Those computed parameters, which minimize the difference, are then used to construct a new plot of clutch torque versus engagement angle.

One possible optimization method that can be used is a method known as the Levenberg-Marquardt non-linear least squares optimization method, although other methods, such as the Gauss-Newton method, can be used as well. The Levenberg-Marquardt algorithm used in the present implementation of the method, as well as other algorithms, are described in a publication of the Technical University of Denmark entitled "Informatics And Mathematical Modeling—Methods For Nonlinear Least Squares Problems" by K. Madson, H. B. Neilsen and O. Tingleff, $2^{nd}$ Edition, published April 2004. Reference may be made to that publication for the purpose of supplementing the present disclosure. It is incorporated herein by reference.

In executing the Levenberg-Marquardt algorithm, the initial values for the parameters $a_1, a_2, a_3 \ldots a_n$ are chosen based on a first guess. These guess values are chosen based upon experience and upon known pre-calibrated values of these parameters for a new clutch. The corresponding relationship of clutch torque and engagement angle is shown in FIG. 3 at 28. This relationship is substituted in the dynamic equations of the system, and the system is integrated using known inputs of engine torque and engagement angle. The corresponding output clutch disk speed curve is shown by a dotted line in FIG. 3a at 39. The output clutch disk speed that is actually measured in the vehicle corresponding to the same inputs is indicated in FIG. 3a by a full line at 37.

Curves of the type shown in FIG. 3 sometimes are referred to as Bezier plots. Other plots that do not have an "S" shape, however, could be used in practicing the present invention.

Figure 3A:
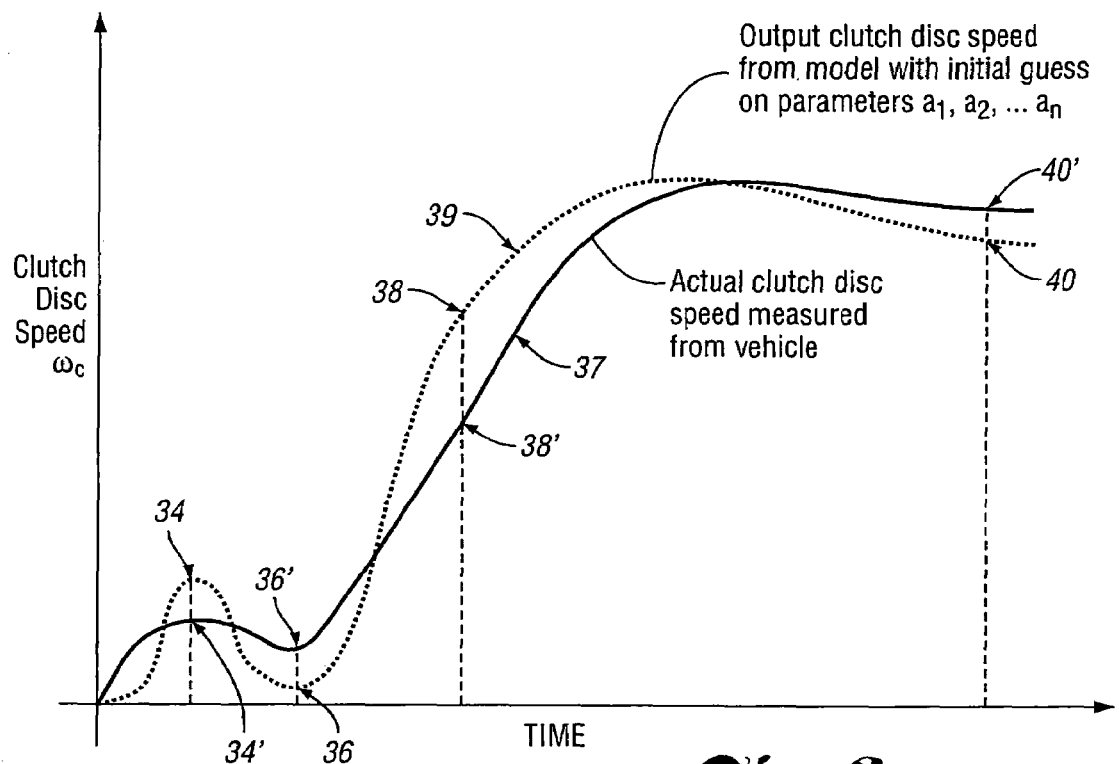
FIG. 3a is a time plot of clutch disk speed for the clutch schematically shown in FIG. 2.

On the curves shown in FIG. 3a, a set of corresponding "m" points is chosen. For purposes of this description, m=4 is chosen. The selected four points on the measured clutch disk speed curve are indicated at points 34', 36', 38' and 40', respectively. The corresponding points on the clutch disk speed output from the model are indicated at points 34, 36, 38 and 40, respectively. The clutch disk speed errors between each set of points 34 and 34', 36 and 36', 38 and 38' and 40 and 40' then are determined. Each error then is squared and a function F is developed, which is the sum of the squares of the errors. Thus, $$F = \tfrac{1}{2}(e_1^2 + e_2^2 + e_3^2 + e_4^2).$$

This expression for F can be generalized as follows:

$$F = \tfrac{1}{2} \Sigma \Delta e_z^2 \text{ where } z=1 \text{ to } m.$$

After the function F is calculated, the so-called Jacobian matrix, which involves partial derivatives of function F with respect to the parameters $a_1, a_2, a_3 \ldots a_n$; i.e., $\delta F/\delta a_1$, $\delta F/\delta a_2 \ldots \delta F/\delta a_n$, is computed.

The Jacobian matrix is defined as:

$$(J(a))_{zj} = \delta F/\delta a_j$$

The next step in executing the algorithm is a computation of new values of $a_1, a_2, a_3 \ldots a_n$. This is done by first calculating the step size h, which is defined by the following equation:

$$(J^T J + \mu I)h = J^T F$$

where $\mu$, is a damping parameter and I is an identity matrix. The term "h" is a vector with a size equal to the number of parameters. Following the calculation of step size h, the new values of parameters are calculated. This computation can be expressed as follows:

$$a_{1(new)} = a_{1(old)} + h_1$$
$$a_{2(new)} = a_{2(old)} + h_2$$
$$\ldots$$
$$a_{n(new)} = a_{n(old)} + h_n$$

The new values of $a_1, a_2, a_3 \ldots a_n$ then are used to calculate a new value for the partial derivative of the function F. That new value for the partial derivative of the function F is compared to the old value for function F. If the new value is less than the old value, that is an indication that the correction of the plot during a given control loop of the microprocessor is correctly adjusting the clutch characteristics to accommodate for wear.

The routine continues by subtracting, during each control loop, the previous computed value for the function F from the new value for the function F. If the difference $\epsilon$ between these values is an insignificant low value, then the optimization procedure is ended. That would correspond to an insignificant difference between measured clutch speed and clutch speed computed during any given control loop of the microprocessor controller 24. If the value for $\epsilon$ is not insignificant during any given control loop, the routine will compute a new value of $\mu$ and return to the previous step where partial derivatives of the function with respect the parameters $a_1, a_2, a_3 \ldots a_n$ are made using new values for $a_1, a_2, a_3 \ldots a_n$. Again, these new values for $a_1, a_2, a_3 \ldots a_n$ are calculated from the dynamic equations previously identified. To prevent the microprocessor from getting stuck in an infinite loop, the maximum number of iterations is limited to a finite value, say niter.

Figure 5:
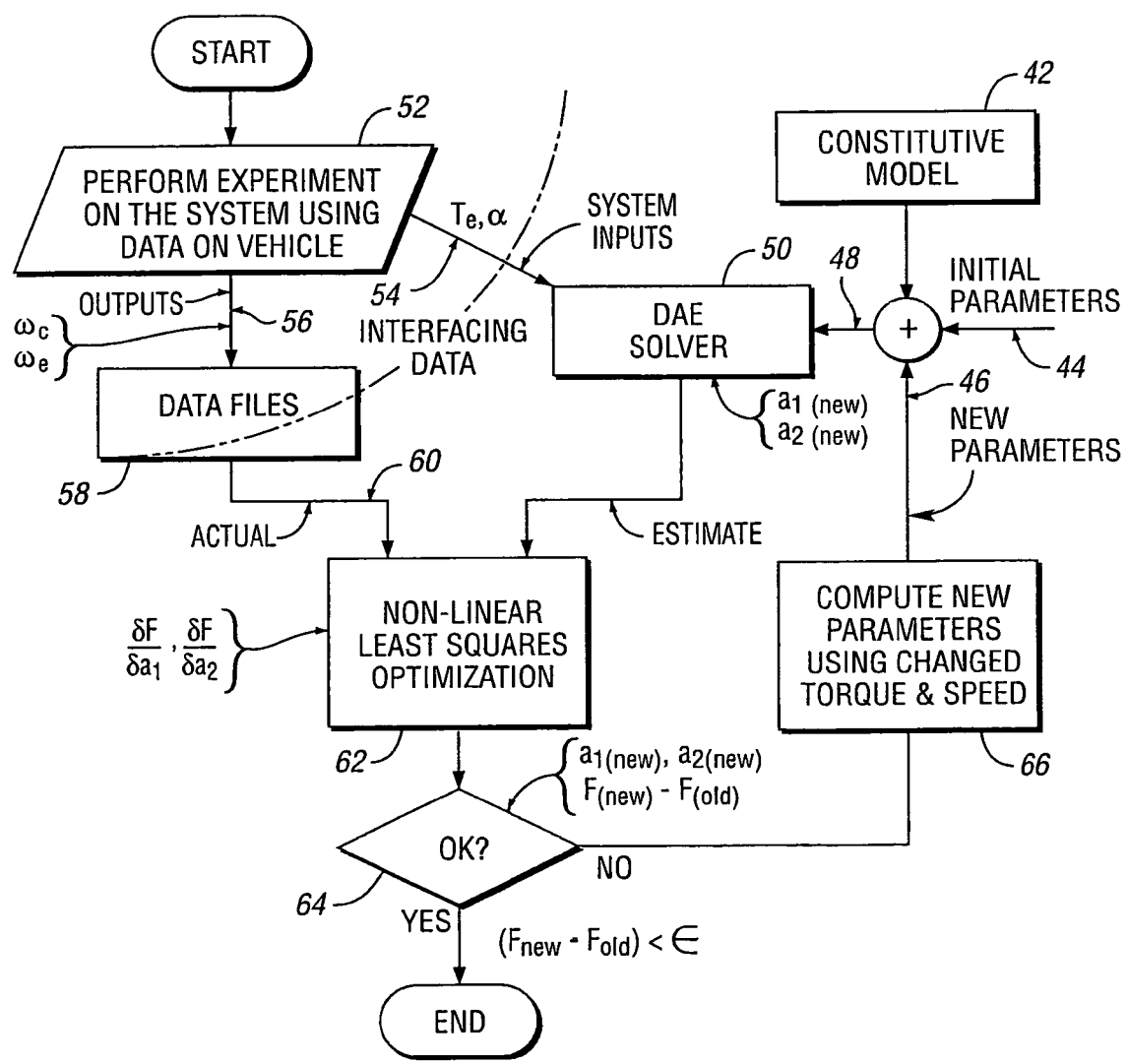
FIG. 5 is a flow chart of the method steps that are used in executing an algorithm for estimating parameters for dynamic clutch engagement characteristics.

FIG. 5 shows the complete algorithm in block diagram form. In FIG. 5, the driveline model is indicated at 42. The initial values for parameters are obtained, as shown at 44. These can come, for example, from operator input or from sets of values stored in ROM. New parameters, which are intermediate computed values, are indicated at 46. The values at 46 are computed using the errors between the measured clutch disk speed $\omega_c$ and outputs of the model based upon the current values of the parameters. The values at 46 are now transferred, as shown at 48, to a differential algebraic equation solver 50 (DAE). Either the new parameters or the initial parameters are transferred through the junction, shown in FIG. 5, to the solver 50, together with the equations in model 42. The junction acts as a switch to transfer either the initial parameters or the new parameters to solver 50.

Data measurements in the vehicle are done at 52, which provides engine torque $T_e$ and an engagement angle $\alpha$ as an input to the equation solver 50, as shown at 54. The outputs for the system 52 are clutch speed and engine speed as shown at 56. These values are stored in data memory files 58 for actual data. That actual data is transferred, as shown at 60, for use in the non-linear optimization process carried out at 62, where the partial derivatives of F with respect to parameters $a_1, a_2, a_3 \ldots a_n$ are computed.

At step 64, it is determined whether the partial derivative of the new function F minus the partial derivative of the old function F is an insignificant low value $\epsilon$. If the difference $\epsilon$ is not insignificant, the routine is finished and the shape of the new characteristic curve for the clutch then will have been defined. If the difference is greater than $\epsilon$, the routine will supply new values of the parameters from block 66 via line 46 to the differential algebraic equation solver 50. The steps in the algorithm are repeated until the difference between the partial derivative of the new function F and the partial derivative of the old function F finally becomes less than $\epsilon$.

Although an embodiment has been described, it will be apparent to persons skilled in the art that modifications may be made without departing from the scope of the invention. All such modifications and equivalents thereof are intended to be defined by the following claims.

What is claimed is:

1. A method for controlling clutch engagement of a friction clutch system in a vehicle powertrain, the powertrain having an engine and a power transmission, the clutch system including a clutch actuator under the control of a vehicle operator, the actuator being movable between a clutch open position and a clutch closed position in accordance with a clutch position variable to establish and disestablish a power flow path from the engine to a powertrain power output element through the transmission, the method comprising the steps of:

developing a dynamic model of the driveline under conditions that cause clutch slipping;

developing an initial functional relationship of the clutch position variable and clutch torque defined by algebraic equations with known parameters that determine an initial clutch engagement characteristic as the clutch position variable changes between an initial clutch slip state value and a clutch engaged state value;

determining an engine torque request in response to vehicle speed requests by the vehicle operator;

using the initial clutch engagement characteristic to determine the clutch position variable;

determining the quality of clutch engagement using the initial clutch engagement characteristic; and determining a target clutch torque; and computing a new estimated clutch engagement characteristic following clutch wear during a clutch operating time history using estimated parameters for the dynamic model whereby optimal clutch engagement quality is achieved.

2. The method set forth in claim 1 wherein the step of computing a new estimated clutch engagement includes the step of minimizing in a repetitive fashion an error between a measured clutch speed following wear and a computed clutch speed following wear determined by using the dynamic model, the new clutch engagement characteristic being determined when the error between the measured and the computed clutch speeds is insignificant.

3. The method set forth in claim 2 wherein the difference between the measured clutch speed and a clutch speed determined by using a set of estimated parameters is minimized repetitively with a non-linear least squares technique until a new set of estimated parameters is obtained.

4. The method set forth in claim 1 wherein the dynamic model is defined by the following differential algebraic expressions:

$$\dot{\omega}_e = -\frac{\beta_e}{J_e}\omega_e - \frac{1}{J_e}T_{cl} + \frac{1}{J_e}T_e \quad (1)$$

$$\dot{\omega}_c = -\frac{\beta_c}{J_c}\omega_c - \frac{1}{J_c}T_l + \frac{1}{J_c}T_{cl} \quad (2)$$

$$T_{cl} = a_0(1-\alpha)^3 + a_1 3\alpha(1-\alpha)^2 + a_2 3\alpha^2(1-\alpha) + a_3\alpha^3 \quad (3)$$

where,
$\omega_e$=Engine speed, measured from experiment;
$\omega_c$=Clutch/Mainshaft speed, measured from experiment;
$\beta_e$=Crankshaft friction coefficient;
$T_e$=Engine torque, measured from vehicle;
$T_{cl}$=Torque transmitted by the clutch, estimated;
$J_e$=Engine inertia;
$T_l$=Load torque at wheel;
$\beta_c$=Mainshaft and wheel friction coefficient;
$J_c$=Inertia of the mainshaft; and
$\alpha$=Angle of engagement.

5. The method set forth in claim 2 wherein the dynamic model is defined by the following differential algebraic expressions:

$$\dot{\omega}_e = -\frac{\beta_e}{J_e}\omega_e - \frac{1}{J_e}T_{cl} + \frac{1}{J_e}T_e \quad (1)$$

$$\dot{\omega}_c = -\frac{\beta_c}{J_c}\omega_c - \frac{1}{J_c}T_l + \frac{1}{J_c}T_{cl} \quad (2)$$

$$T_{cl} = a_0(1-\alpha)^3 + a_1 3\alpha(1-\alpha)^2 + a_2 3\alpha^2(1-\alpha) + a_3\alpha^3 \quad (3)$$

where,
$\omega_e$=Engine speed, measured from experiment;
$\omega_c$=Clutch/Mainshaft speed, measured from experiment;
$\beta_e$=Crankshaft friction coefficient;
$T_e$=Engine torque, measured from vehicle;
$T_{cl}1$ =Torque transmitted by the clutch, estimated;
$J_e$=Engine inertia;
$T_l$=Load torque at wheel;
$\beta_c$=Mainshaft and wheel friction coefficient;
$J_c$=Inertia of the Mainshaft; and
$\alpha$=Angle of engagement.

6. The method set forth in claim 3 wherein the step of estimating the new clutch engagement characteristic comprises using estimated values for parameters for the algebraic equations;
determining the error between measured clutch speed and clutch speed indicated by a solution of the differential algebraic equations at various time samples;
computing the sum of the squares of the errors to define an error function; and
minimizing the error function in a repetitive fashion until it does not change significantly.

7. The method set forth in claim 6 wherein the step of minimizing the error function comprises computing a partial derivative of the error function with respect each of multiple parameters of a previously computed clutch engagement characteristic;
computing a corresponding engagement characteristic using a previously computed engagement characteristic and partial derivatives of the error functions;
computing a new error function using the new parameters; and
comparing the new error function to a previously computed error function to determine whether the new error function is not significantly less than the previously computed error function.

8. The method set forth in claim 6 wherein the step of minimizing the error function includes repeating the error function computation if the value of the new error function is not less than the value of the previously computed error function by an insignificant amount.

9. A speed-based method for determining clutch engagement characteristics for a friction clutch in a powertrain for a wheeled vehicle, the friction clutch having a displaceable actuator element that is movable by a vehicle operator between a clutch open position to a clutch closed position as a power flow path from an engine to vehicle traction wheels is established and disestablished, the method comprising the steps of:
developing a driveline system dynamic model when the friction clutch is slipping, the model and a functional relationship between clutch torque and displacement of the actuator element defining clutch engagement characteristics;
measuring clutch output speed;
solving the driveline system dynamic model to obtain a set of computed clutch output speed values;
estimating parameters of clutch engagement characteristics by minimizing errors between the measured and computed clutch output speed values; and
computing repetitively clutch engagement characteristics using estimated clutch engagement parameters during a period following clutch wear to achieve optimum clutch engagement quality.

10. The method set forth in claim 9 wherein the dynamic model is defined by equations:

$$\dot{\omega}_e = -\frac{\beta_e}{J_e}\omega_e - \frac{1}{J_e}T_{cl} + \frac{1}{J_e}T_e \quad (1)$$

$$\dot{\omega}_c = -\frac{\beta_c}{J_c}\omega_c - \frac{1}{J_c}T_l + \frac{1}{J_c}T_{cl} \quad (2)$$

$$T_{cl} = a_0(1-\alpha)^3 + a_1 3\alpha(1-\alpha)^2 + a_2 3\alpha^2(1-\alpha) + a_3\alpha^3 \quad (3)$$

where:
$\omega_e$=Engine speed, measured from experiment;
$\omega_c$=Clutch/Mainshaft speed, measured from experiment;
$\beta_e$=Crankshaft friction coefficient;
$T_e$=Engine torque, measured from vehicle;
$T_{cl}$=Torque transmitted by the clutch, estimated;
$J_e$=Engine inertia;
$T_l$=Load torque at wheel;
$\beta_c$=Mainshaft and wheel friction coefficient;
$J_c$=Inertia of the Mainshaft; and
$\alpha$=Angle of engagement.

11. The method set forth in claim 9 wherein estimated clutch engagement characteristics are computed following wear of the clutch in a time period later in a clutch operating history than an initial time period, the estimated clutch engagement characteristic being computed by using a new set of parameters and a least squares error function based on a difference between actual clutch speed values and calculated clutch speed values for given actuator element displacements.

12. The method set forth in claim 10 wherein:
computing the clutch engagement characteristics includes computing a least squares error function for clutch speeds at multiple actuator element displacements;
computing partial derivatives of the least squares error function;
computing new clutch speeds at the multiple actuator element displacements using a new set of parameters and the partial derivatives of the least squares error function;
comparing a least square error function using the set of parameters previously determined to a current least squares error function; and
repeating clutch engagement characteristic computations at multiple time samples until the difference in the least squares error functions is insignificant.

* * * * *